(12) United States Patent
Unterguggenberger et al.

(10) Patent No.: US 10,747,210 B2
(45) Date of Patent: Aug. 18, 2020

(54) SYSTEM AND METHOD FOR AUTOMATING USER INTERACTION FOR SEMICONDUCTOR MANUFACTURING EQUIPMENT

(71) Applicant: LAM RESEARCH CORPORATION, Fremont, CA (US)

(72) Inventors: Rainer Unterguggenberger, Newark, CA (US); Henry Chan, Morgan Hill, CA (US); Chung-Ho Huang, San Jose, CA (US); Vincent Wong, Fremont, CA (US); David Hemker, San Jose, CA (US)

(73) Assignee: Lam Research Corporation, Fremont, CA (US)

( * ) Notice: Subject to any disclaimer, the term of this patent is extended or adjusted under 35 U.S.C. 154(b) by 53 days.

(21) Appl. No.: 16/119,202

(22) Filed: Aug. 31, 2018

(65) Prior Publication Data
US 2019/0079503 A1 Mar. 14, 2019

Related U.S. Application Data

(60) Provisional application No. 62/556,733, filed on Sep. 11, 2017.

(51) Int. Cl.
*G05B 19/418* (2006.01)
*G05B 13/02* (2006.01)
*G05B 23/02* (2006.01)

(52) U.S. Cl.
CPC ... *G05B 19/41865* (2013.01); *G05B 13/0265* (2013.01); *G05B 23/0267* (2013.01); *G05B 23/0283* (2013.01); *G05B 2219/25236* (2013.01); *G05B 2219/2602* (2013.01); *G05B 2219/32128* (2013.01); *G05B 2219/36039* (2013.01); *G05B 2219/36297* (2013.01); *G05B 2219/45031* (2013.01)

(58) Field of Classification Search
None
See application file for complete search history.

(56) References Cited

U.S. PATENT DOCUMENTS

| | | | | |
|---|---|---|---|---|
| 6,122,566 A | * | 9/2000 | Nguyen | ............ H01L 21/67167 438/908 |
| 9,471,873 B1 | | 10/2016 | Wu | |
| 2007/0009345 A1 | * | 1/2007 | Hall | ................ H01L 21/67775 414/222.01 |
| 2007/0179650 A1 | * | 8/2007 | Rosenbaum | ......... G05B 19/409 700/96 |
| 2007/0260420 A1 | * | 11/2007 | Johnson | ............... G01B 21/042 702/152 |

(Continued)

OTHER PUBLICATIONS

Extended European Search Report for Application No. EP18193543 dated Feb. 13, 2019.

*Primary Examiner* — Ramesh B Patel

(57) ABSTRACT

A system includes an interface and a controller. The interface is configured to receive a state of a substrate processing tool comprising a plurality of process modules configured to process a substrate. The controller is configured to correlate the state with an input previously received by the substrate processing tool from the interface based on the state and to generate an output to control the substrate processing tool based on the correlation.

33 Claims, 8 Drawing Sheets

(56) References Cited

U.S. PATENT DOCUMENTS

| | | | |
|---|---|---|---|
| 2009/0037013 A1* | 2/2009 | Hendler | G05B 19/41875 |
| | | | 700/103 |
| 2009/0228408 A1 | 9/2009 | Kaushal et al. | |
| 2012/0242667 A1 | 9/2012 | Kaushal et al. | |
| 2012/0303142 A1* | 11/2012 | Hendler | G05B 19/41875 |
| | | | 700/31 |
| 2014/0195184 A1 | 7/2014 | Maeda et al. | |
| 2014/0369793 A1* | 12/2014 | Hall | H01L 21/67775 |
| | | | 414/222.02 |
| 2016/0370797 A1* | 12/2016 | Azarya | H01L 21/67253 |

\* cited by examiner

SYSTEM AND METHOD FOR AUTOMATING USER INTERACTION FOR SEMICONDUCTOR MANUFACTURING EQUIPMENT

CROSS-REFERENCE TO RELATED APPLICATIONS

This application claims the benefit of U.S. Provisional Application No. 62/556,733, filed on Sep. 11, 2017. The entire disclosure of the application referenced above is incorporated herein by reference.

FIELD

The present disclosure relates generally to semiconductor manufacturing equipment and more particularly to automating user interactions for semiconductor manufacturing equipment via artificial intelligence.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A substrate processing system typically includes a plurality of processing chambers (also called process modules) to perform deposition, etching, and other treatment of substrates such as semiconductor wafers. During processing, a substrate is arranged on a substrate support in a processing chamber of the substrate processing system. During deposition, gas mixtures including one or more precursors are introduced into the processing chamber, and plasma may be struck to activate chemical reactions. During etching, gas mixtures including etch gases are introduced, and plasma may be struck to activate chemical reactions. A computer-controlled robot typically transfers semiconductor substrates from one processing chamber to another in a sequence in which the semiconductor substrates are to be processed.

SUMMARY

A system comprises an interface and a controller. The interface is configured to receive a state of a substrate processing tool comprising a plurality of process modules configured to process a substrate. The controller is configured to correlate the state with an input previously received by the substrate processing tool from the interface based on the state and to generate an output to control the substrate processing tool based on the correlation.

In other features, the controller is configured to store in a database a plurality of states of the substrate processing tool and corresponding inputs received by the substrate processing tool based on the plurality of states, and to perform the correlation using the database.

In other features, the controller is configured to update the database based on historical data associated with one or more of the substrate processing tool and an additional substrate processing tool, and to perform the correlation using the updated database.

In other features, the controller is configured to store in the database data associated with an additional substrate processing tool, the data including states of the additional substrate processing tool and corresponding inputs received by the additional substrate processing tool based on the states, and to perform the correlation using the data.

In other features, the state of the substrate processing tool includes data indicating an error associated with the substrate processing tool, and the input includes data indicating a response to the error.

In other features, the state of the substrate processing tool includes data indicating an impending error associated with the substrate processing tool, and the input includes data indicating a response to prevent the error.

In other features, the controller is configured to detect presence of an operator of the substrate processing tool and to control the substrate processing tool according to a response received by the operator based on the output.

In other features, the controller is configured to detect absence of an operator of the substrate processing tool and to control the substrate processing tool in the absence of the operator based on the output.

In other features, the controller is configured to detect absence of an operator of the substrate processing tool and to inform the operator regarding the output.

In other features, the controller is configured to control the substrate processing tool based on the output to ensure completion of processing of the substrate, prevent damage to the substrate, and prevent idling of the process modules.

In other features, the controller is configured to control the substrate processing tool based on the output to optimize scheduling of processing of the substrate by the process modules.

In still other features, a method comprises receiving a state of a substrate processing tool comprising a plurality of process modules configured to process a substrate. The method further comprises correlating the state with an input previously received by the substrate processing tool based on the state. The method further comprises generating an output to control the substrate processing tool based on the correlation.

In other features, the method further comprises storing in a database a plurality of states of the substrate processing tool and corresponding inputs received by the substrate processing tool based on the plurality of states. The method further comprises performing the correlation using the database.

In other features, the method further comprises updating the database based on historical data associated with one or more of the substrate processing tool and an additional substrate processing tool. The method further comprises performing the correlation using the updated database.

In other features, the method further comprises storing in the database data associated with an additional substrate processing tool, the data including states of the additional substrate processing tool and corresponding inputs received by the additional substrate processing tool based on the states. The method further comprises performing the correlation using the data.

In other features, the state of the substrate processing tool includes data indicating an error associated with the substrate processing tool, and the input includes data indicating a response to the error.

In other features, the state of the substrate processing tool includes data indicating an impending error associated with the substrate processing tool, and the input includes data indicating a response to prevent the error.

In other features, the method further comprises detecting presence of an operator of the substrate processing tool. The method further comprises controlling the substrate processing tool according to a response received by the operator based on the output.

In other features, the method further comprises detecting absence of an operator of the substrate processing tool. The method further comprises controlling the substrate processing tool in the absence of the operator based on the output.

In other features, the method further comprises detecting absence of an operator of the substrate processing tool. The method further comprises informing the operator regarding the output.

In other features, the method further comprises controlling the substrate processing tool based on the output to ensure completion of processing of the substrate, prevent damage to the substrate, and prevent idling of the process modules.

In other features, the method further comprises controlling the substrate processing tool based on the output to optimize scheduling of processing of the substrate by the process modules.

In still other features, a system comprises a processor and machine readable instructions stored on a tangible machine readable medium. When executed by the processor, the machine readable instructions configure the processor to receive a state of a substrate processing tool comprising a plurality of process modules configured to process a substrate. The machine readable instructions configure the processor to correlate the state with an input previously received by the substrate processing tool based on the state. The machine readable instructions configure the processor to generate an output to control the substrate processing tool based on the correlation.

In other features, the machine readable instructions configure the processor to store in a database a plurality of states of the substrate processing tool and corresponding inputs received by the substrate processing tool based on the plurality of states. The machine readable instructions configure the processor to perform the correlation using the database.

In other features, the machine readable instructions configure the processor to update the database based on historical data associated with one or more of the substrate processing tool and an additional substrate processing tool. The machine readable instructions configure the processor to perform the correlation using the updated database.

In other features, the machine readable instructions configure the processor to store in the database data associated with an additional substrate processing tool, the data including states of the additional substrate processing tool and corresponding inputs received by the additional substrate processing tool based on the states. The machine readable instructions configure the processor to perform the correlation using the data.

In other features, the state of the substrate processing tool includes data indicating an error associated with the substrate processing tool, and the input includes data indicating a response to the error.

In other features, the state of the substrate processing tool includes data indicating an impending error associated with the substrate processing tool, and the input includes data indicating a response to prevent the error.

In other features, the machine readable instructions configure the processor to detect presence of an operator of the substrate processing tool. The machine readable instructions configure the processor to control the substrate processing tool according to a response received by the operator based on the output.

In other features, the machine readable instructions configure the processor to detect absence of an operator of the substrate processing tool. The machine readable instructions configure the processor to control the substrate processing tool in the absence of the operator based on the output.

In other features, the machine readable instructions configure the processor to detect absence of an operator of the substrate processing tool. The machine readable instructions configure the processor to inform the operator regarding the output.

In other features, the machine readable instructions configure the processor to control the substrate processing tool based on the output to ensure completion of processing of the substrate, prevent damage to the substrate, and prevent idling of the process modules.

In other features, the machine readable instructions configure the processor to control the substrate processing tool based on the output to optimize scheduling of processing of the substrate by the process modules.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
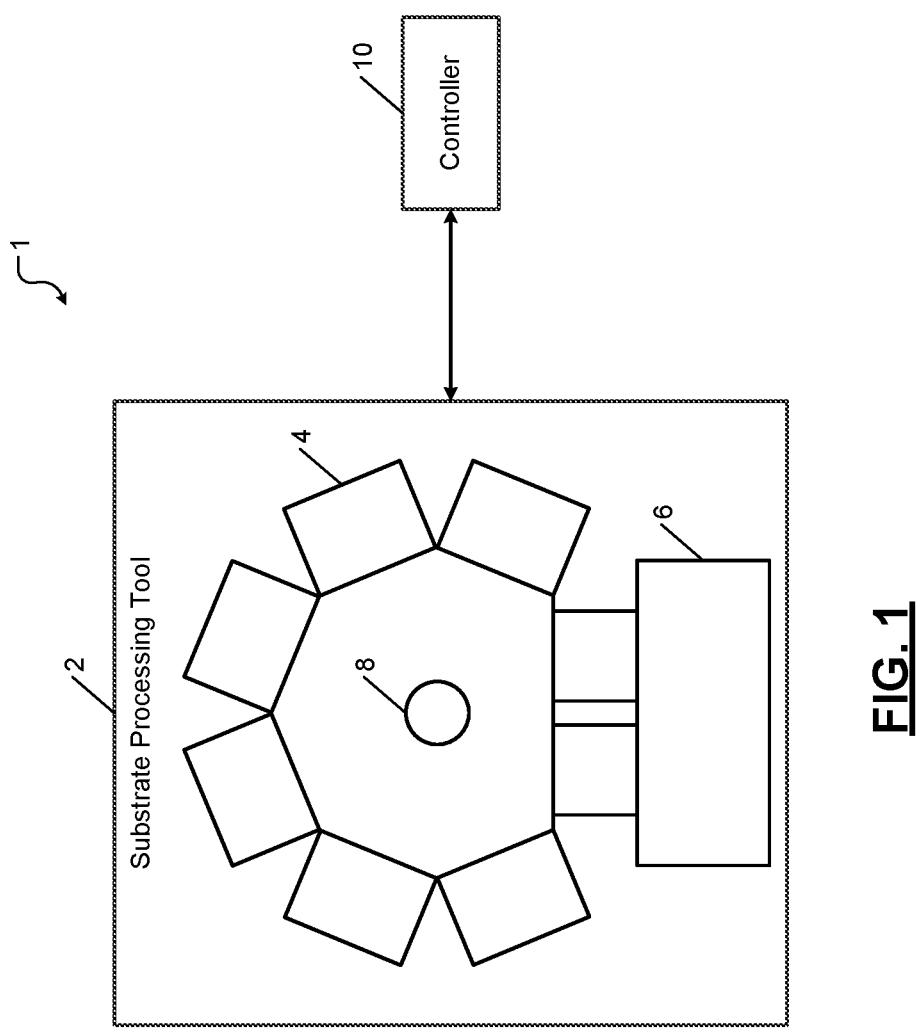
FIG. 1 is a functional block diagram of an example of a substrate processing system according to the present disclosure.

The present disclosure relates to systems and methods for automating user interactions for semiconductor processing tools via artificial intelligence. Semiconductor processing tools have high variability in terms of features, options, and processes. The current method of automating customer interactions involves translating customer requests into requirements and subsequently implementing the features on the control system of the semiconductor processing tool of the customer. The current method faces many challenges. For example, some customer requirements are very specific and temporary. For these requests, the turnaround time for traditional development cycles, which includes custom programming, is long and expensive.

Instead of hard coding the procedures and sequences for controlling each semiconductor processing tool, the present disclosure proposes a control system to enable the semiconductor processing tool to learn and train based on user interactions with the substrate processing tool. The learning and training can be used to automate user interactions with the substrate processing tool. For example, the learning and training can be used to perform complicated maintenance tasks, automate wafer throughput analysis, and optimize scheduling to reduce idle times of process modules. The learning and training can be used to detect errors and suggest error recovery procedures. The learning and training can also be used to perform the error recovery procedures automatically to prevent damage to the wafer and/or the substrate processing tool.

For example, the control system can learn from user actions/interventions performed during tool operations/error recoveries in real-time. Once the control system is trained and ready to perform tasks automatically, the user can select an automated mode for the control system to take over during production. When the automated mode is active, the control system intervenes when damage to wafer/tool is likely to occur if no user is present to intervene. If the user is present, the control system can offer to assist the user. The user can let the control system take over and respond automatically, or the user can control the operation of the control system. Accordingly, the control system can operate independently of the user, or can suggest actions and perform tasks with user interaction.

The control system analyzes data from various sensors and data associated with various states of the substrate processing tool in real time. Examples of tool states include but are not limited to the tool being idle, under maintenance, in energy saving mode, and so on. Broadly speaking, a state of a tool (i.e., a substrate processing tool) is a snapshot of operating parameters or conditions of the tool at a given moment. The control system can learn how the user reacts or responds to tool states.

For example, after the user reacts similarly to a tool state (e.g., after the user performs a series of operations or commands in response to a tool state) a predetermined number (e.g., 3 to 5) of times, the control system can learn the sequence of operations performed by the user in response to the tool state. Subsequently, based on the learning, upon encountering that tool state, the control system correlates the tool state with the learned user actions or responses for that tool state. The control system can execute the learned sequence of operations without any user intervention or can offer to perform the sequence.

The control system can also learn from historical data (e.g., event log, alarm log, etc.) available from various substrate processing tools. For example, the historical data can be replayed in a simulator, and a database of tool states and user responses to the tool states can be generated or compiled. Then with access to tool information in real time, the control system can apply the learned knowledge to any situation that may occur during production. The database built using knowledge gained from the other tools can be customized for a control system of a specific substrate processing tool. The knowledge gained from the other tools can also be used to update an in-use database of a control system of a substrate processing tool. These and other features of the systems and methods of the present disclosure are described below in detail.

The present disclosure is organized as follows. A substrate processing system including a substrate processing tool is described with reference to FIG. 1. Examples of process modules (processing chambers) of the substrate processing tool are described with reference to FIGS. 2 and 3. A controller that controls the substrate processing tool is described with reference to FIG. 4. A networked system including the substrate processing system, a plurality of upstream and downstream systems, a metrology system, and a host is described with reference to FIG. 5. The networked system further including a plurality of substrate processing systems is described with reference to FIG. 6. Various methods for controlling the substrate processing tool using the controller are subsequently described with reference to FIGS. 7-9.

FIG. 1 shows a top-down view of an example of a substrate processing system 1. The substrate processing system 1 includes a substrate processing tool 2 and a controller 10. The substrate processing tool 2 (also called the tool throughout the present disclosure) includes a plurality of process modules 4. For example, each of the process modules 4 may be configured to perform one or more respective processes on a substrate. Substrates to be processed are loaded into the substrate process processing tool 2 via ports of a loading station of an equipment front end module (EFEM) 6. A robot 8 transfers the substrates into one or more of the process modules 4 in a sequence in which the substrates are to be processed by the process modules 4. The controller 10 controls the substrate processing tool 2 as described below with reference to FIG. 4. The controller 10 can include a server or any other suitable computing device that can perform the described functionality.

Figure 2:
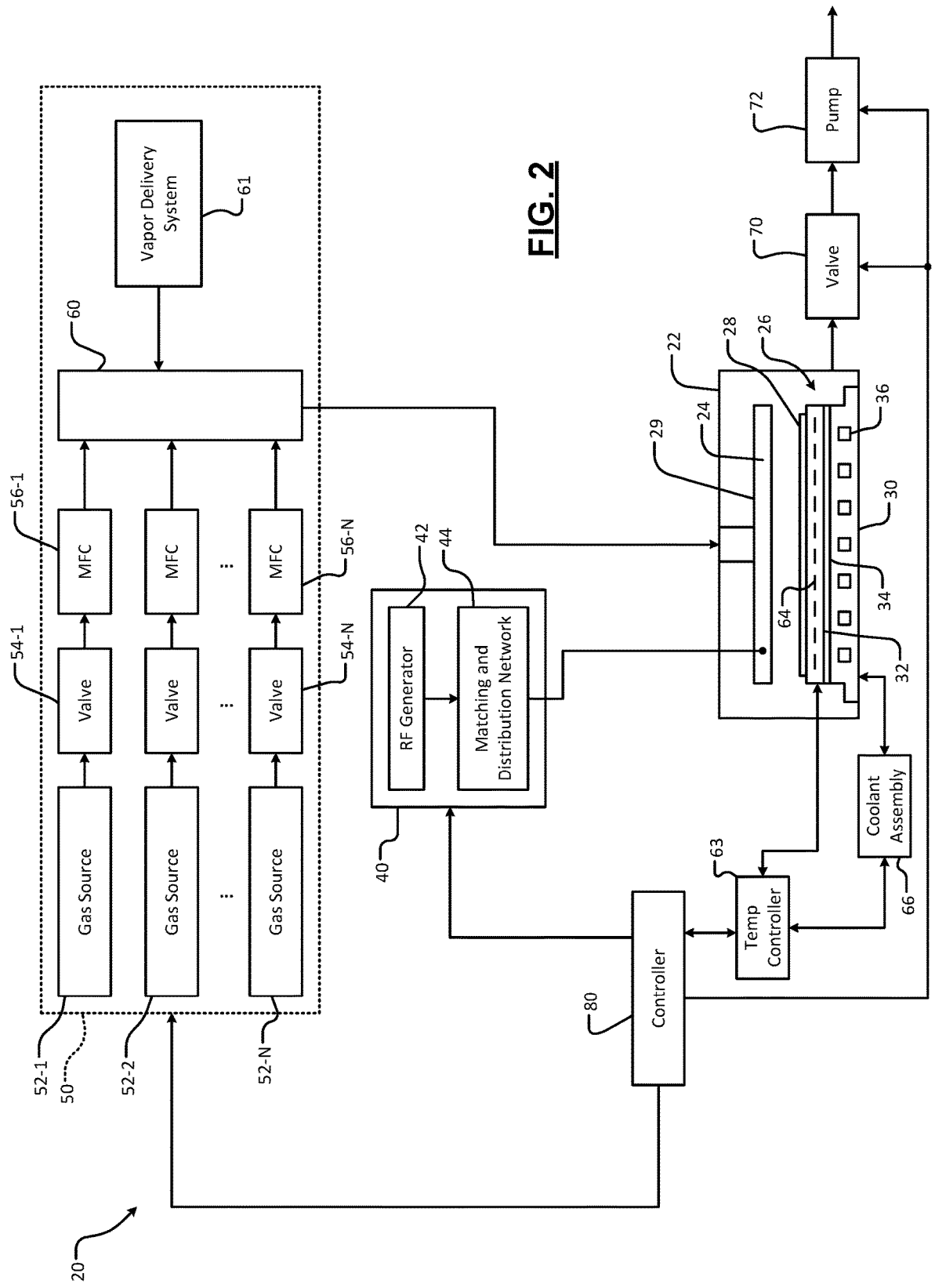
FIG. 2 is a functional block diagram of one example of a process module of the substrate processing system of FIG. 1 according to the present disclosure.

FIG. 2 shows a system 20 as an example of the process module 4. While the foregoing example will be described in the context of plasma enhanced chemical vapor deposition (PECVD), the teachings of the present disclosure may be applied to other substrate processing systems such as atomic layer deposition (ALD), PEALD, CVD, or other process. The system 20 includes a processing chamber 22 that encloses other components of the system 20 and contains the RF plasma (if used). The system 20 includes an upper electrode 24 and an electrostatic chuck (ESC) 26 or other substrate support. During operation, a substrate 28 is arranged on the ESC 26.

For example, the upper electrode 24 may include a gas distribution device 29 such as a showerhead that introduces and distributes process gases. The gas distribution device 29 may include a stem portion including one end connected to a top surface of the processing chamber. A base portion is generally cylindrical and extends radially outwardly from an opposite end of the stem portion at a location that is spaced from the top surface of the processing chamber. A substratefacing surface or faceplate of the base portion of the showerhead includes a plurality of holes through which vaporized precursor, process gas, or purge gas flows. Alternately, the upper electrode 24 may include a conducting plate, and the process gases may be introduced in another manner.

The ESC 26 includes a baseplate 30 that acts as a lower electrode. The baseplate 30 supports a heating plate 32, which may correspond to a ceramic multi-zone heating plate. A thermal resistance layer 34 may be arranged between the heating plate 32 and the baseplate 30. The baseplate 30 may include one or more channels 36 for flowing coolant through the baseplate 30.

If plasma is used, an RF generating system 40 generates and outputs an RF voltage to one of the upper electrode 24 and the lower electrode (e.g., the baseplate 30 of the ESC 26). The other one of the upper electrode 24 and the baseplate 30 may be DC grounded, AC grounded, or floating. For example only, the RF generating system 40 may include an RF generator 42 that generates RF power that is fed by a matching and distribution network 44 to the upper electrode 24 or the baseplate 30. In other examples, the plasma may be generated inductively or remotely.

A gas delivery system 50 includes one or more gas sources 52-1, 52-2, . . . , and 52-N (collectively gas sources 52), where N is an integer greater than zero. The gas sources 52 are connected by valves 54-1, 54-2, . . . , and 54-N (collectively valves 54) and mass flow controllers 56-1, 56-2, . . . , and 56-N (collectively mass flow controllers 56) to a manifold 60. A vapor delivery system 61 supplies vaporized precursor to the manifold 60 or another manifold (not shown) that is connected to the processing chamber 22. An output of the manifold 60 is fed to the processing chamber 22.

A temperature controller 63 may be connected to a plurality of thermal control elements (TCEs) 64 arranged in the heating plate 32. The temperature controller 63 may be used to control the plurality of TCEs 64 to control a temperature of the ESC 26 and the substrate 28. The temperature controller 63 may communicate with a coolant assembly 66 to control coolant flow through the channels 36. For example, the coolant assembly 66 may include a coolant pump, a reservoir, and one or more temperature sensors. The temperature controller 63 operates the coolant assembly 66 to selectively flow the coolant through the channels 36 to cool the ESC 26.

A valve 70 and pump 72 may be used to evacuate reactants from the processing chamber 22. A system controller 80 may be used to control components of the system 20.

Figure 3:
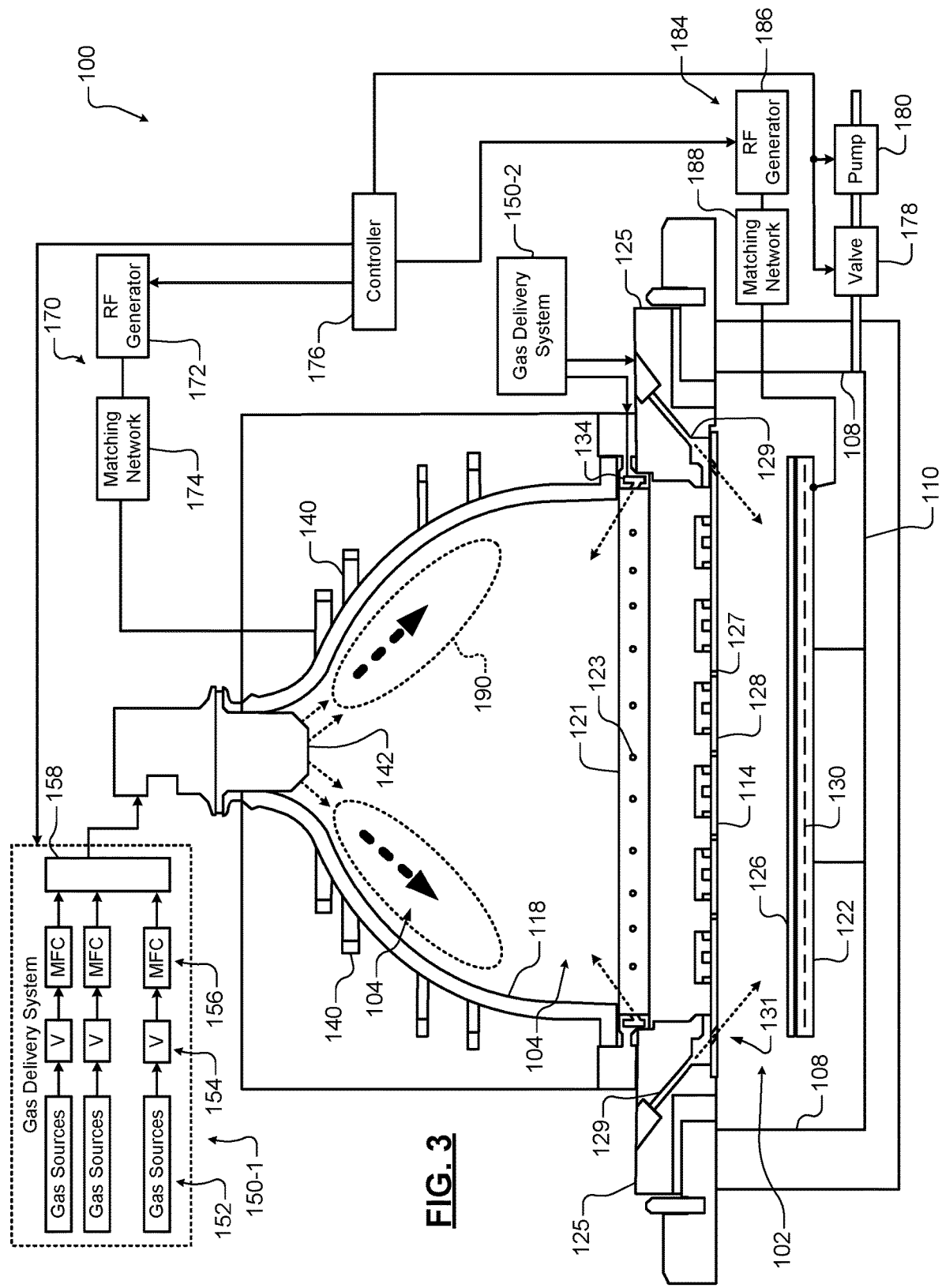
FIG. 3 is a functional block diagram of another example of a process module of the substrate processing system of FIG. 1 according to the present disclosure.

FIG. 3 shows a processing chamber 100 for etching a layer of a substrate as an example of the process module 4. While a specific chamber is shown and described, the teachings of the present disclosure may be applied to other substrate processing apparatuses.

The processing chamber 100 includes a lower chamber region 102 and an upper chamber region 104. The lower chamber region 102 is defined by chamber sidewall surfaces 108, a chamber bottom surface 110, and a lower surface of a gas distribution device 114.

The upper chamber region 104 is defined by an upper surface of the gas distribution device 114 and an inner surface of a dome 118. In some examples, the dome 118 rests on a first annular support 121. In some examples, the first annular support 121 includes one or more spaced holes 123 for delivering process gas to the upper chamber region 104. In some examples, the process gas is delivered by the one or more spaced holes 123 in an upward direction at an acute angle relative to a plane including the gas distribution device 114, although other angles/directions may be used. In some examples, a gas flow channel 134 in the first annular support 121 supplies gas to the one or more spaced holes 123.

The first annular support 121 may rest on a second annular support 125 that defines one or more spaced holes 127 for delivering process gas from a gas flow channel 129 to the lower chamber region 102. In some examples, holes 131 in the gas distribution device 114 align with the holes 127. In other examples, the gas distribution device 114 has a smaller diameter, and the holes 131 are not needed. In some examples, the process gas is delivered by the one or more spaced holes 127 in a downward direction towards a substrate 126 at an acute angle relative to the plane including the gas distribution device 114, although other angles/directions may be used.

In other examples, the upper chamber region 104 is cylindrical with a flat top surface and one or more flat inductive coils may be used. In still other examples, a single chamber may be used with a spacer located between a showerhead and the substrate support.

A substrate support 122 is arranged in the lower chamber region 104. In some examples, the substrate support 122 includes an electrostatic chuck (ESC), although other types of substrate supports can be used. The substrate 126 is arranged on an upper surface of the substrate support 122 during etching. In some examples, a temperature of the substrate 126 may be controlled by a heater plate 125, 130 an optional cooling plate with fluid channels, and one or more sensors (not shown), although any other suitable substrate support temperature control system may be used.

In some examples, the gas distribution device 114 includes a showerhead (for example, a plate 128 having a plurality of spaced holes 127). The plurality of spaced holes 127 extend from the upper surface of the plate 128 to the lower surface of the plate 128. In some examples, the spaced holes 127 have a diameter in a range from 0.4" to 0.75" and the showerhead is made of a conducting material such as aluminum or a non-conductive material such as ceramic with an embedded electrode made of a conducting material.

One or more inductive coils 140 are arranged around an outer portion of the dome 118. When energized, the one or more inductive coils 140 create an electromagnetic field inside of the dome 118. In some examples, an upper coil and a lower coil are used. A gas injector 142 injects one or more gas mixtures from a gas delivery system 150-1.

In some examples, the gas delivery system 150-1 includes one or more gas sources 152, one or more valves 154, one or more mass flow controllers (MFCs) 156, and a mixing manifold 158, although other types of gas delivery systems may be used. A gas splitter (not shown) may be used to vary flow rates of a gas mixture. Another gas delivery system 150-2 may be used to supply an etch gas or an etch gas mixture to the gas flow channels 129 and/or 134 (in addition to or instead of etch gas from the gas injector 142).

In some examples, the gas injector 142 includes a center injection location that directs gas in a downward direction and one or more side injection locations that inject gas at an angle with respect to the downward direction. In some examples, the gas delivery system 150-1 delivers a first portion of the gas mixture at a first flow rate to the center injection location and a second portion of the gas mixture at a second flow rate to the side injection location(s) of the gas injector 142. In other examples, different gas mixtures are delivered by the gas injector 142. In some examples, the gas delivery system 150-1 delivers tuning gas to the gas flow channels 129 and 134 and/or to other locations in the processing chamber as will be described below.

A plasma generator 170 may be used to generate RF power that is output to the one or more inductive coils 140. Plasma 190 is generated in the upper chamber region 104. In some examples, the plasma generator 170 includes an RF generator 172 and a matching network 174. The matching network 174 matches an impedance of the RF generator 172 to the impedance of the one or more inductive coils 140. In some examples, the gas distribution device 114 is connected to a reference potential such as ground. A valve 178 and a pump 180 may be used to control pressure inside of the lower and upper chamber regions 102, 104 and to evacuate reactants.

A controller 176 communicates with the gas delivery systems 150-1 and 150-2, the valve 178, the pump 180, and the plasma generator 170 to control flow of process gas, purge gas, RF plasma and chamber pressure. In some examples, plasma is sustained inside the dome 118 by the one or more inductive coils 140. One or more gas mixtures are introduced from a top portion of the chamber using the gas injector 142 (and/or holes 123), and plasma is confined within the dome 118 using the gas distribution device 114.

Confining the plasma in the dome 118 allows volume recombination of plasma species and effusing desired etchant species through the gas distribution device 114. In some examples, there is no RF bias applied to the substrate 126. As a result, there is no active sheath on the substrate 126 and ions are not hitting the substrate with any finite energy. Some amount of ions will diffuse out of the plasma region through the gas distribution device 114. However, the amount of plasma that diffuses is an order of magnitude lower than the plasma located inside the dome 118. Most ions in the plasma are lost by volume recombination at high pressures. Surface recombination loss at the upper surface of the gas distribution device 114 also lowers ion density below the gas distribution device 114.

In other examples, an RF bias generator 184 is provided and includes an RF generator 186 and a matching network 188. The RF bias can be used to create plasma between the gas distribution device 114 and the substrate support or to create a self-bias on the substrate 126 to attract ions. The controller 176 may be used to control the RF bias.

Figure 4:
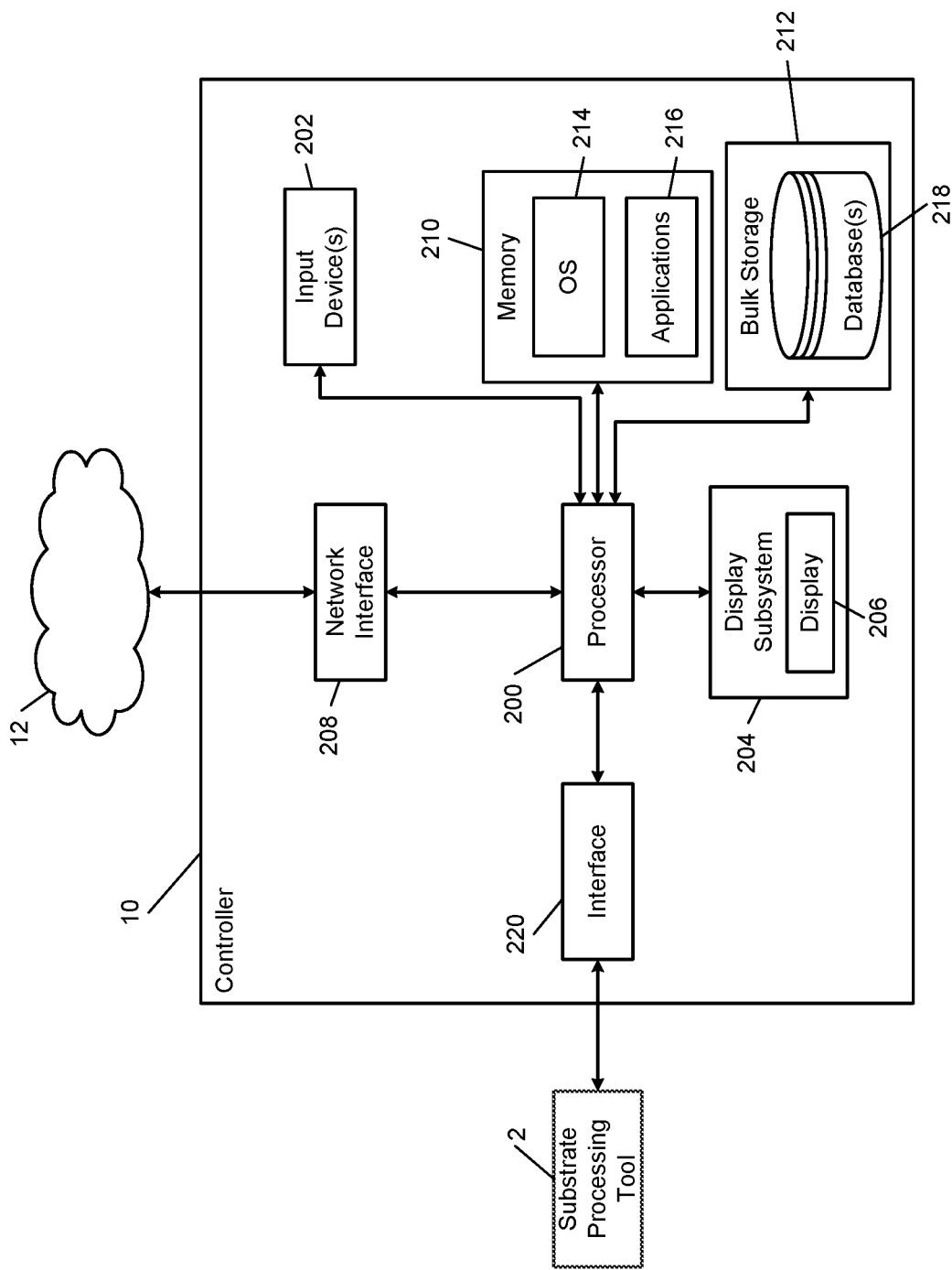
FIG. 4 is a functional block diagram of a controller that controls a substrate processing tool of the substrate processing system of FIG. 1 according to the present disclosure.

FIG. 4 shows a simplified example of the controller 10 that controls the substrate processing tool 2 shown in FIG. 1. For example, the controller 10 may include a server or any other suitable computing device that can perform the described functionality. The controller 10 typically includes one or more CPUs or processors 200, one or more input devices 202 (e.g., a keypad, touchpad, mouse, and so on), a display subsystem 204 including a display 206, a network interface 208, a memory 210, and a bulk storage 212.

The network interface 208 connects the controller 10 to a distributed network system 12. The distributed network system 12 may include a local area network (LAN), a wide area network (WAN) such as the Internet, or other type of network. For example, the network interface 208 may include a wired interface (e.g., an Ethernet interface) and/or a wireless interface (e.g., a Wi-Fi, Bluetooth, near field communication (NFC), or other wireless interface). The memory 210 may include volatile or nonvolatile memory, cache, or other type of memory. The bulk storage 212 may include flash memory, one or more hard disk drives (HDDs), or other bulk storage device.

The processor 200 of the controller 10 executes an operating system (OS) 214 and one or more applications 216. The applications 216 implement the control system that controls the substrate processing tool 2. The applications 216 implement the methods described below with reference to FIGS. 7-9 to automate user interactions for the substrate processing tool 2 via artificial intelligence. The applications 216 implement an artificial intelligence (AI) engine that automates user interactions for the substrate processing tool 2. The bulk storage 212 may store one or more databases 218 that store data structures used by the applications 216 to perform respective functions.

The controller 10 includes an interface 220 that interfaces the controller 10 to the process modules 4 and the robot 8. The controller 10 controls the robot 8 and the process modules 4 of the substrate processing tool 2 via the interface 220. The controller 10 communicates with the controllers 80 and 176 of the process modules 4 shown in FIGS. 2 and 3 via the interface 220. The controllers 80 and 176 of the process modules 4 may also include a server or any other suitable computing device that can perform the described functionality. The controller 10 communicates with various sensors employed by the substrate processing tool 2 via the interface 220. The controller 10 receives data from various sensors associated with the process modules 4 and the robot 8 via the interface 220.

The controller 10 sends signals through the interface 220 to control various components of the substrate processing tool 2. For example, the signals may control the valves, pumps, and so on in the process modules 4; the signals may control various process parameters including pressure, temperature, power, gases, and so on in the process modules 4; the signals may control the robot 8; and so on.

The controller 10 determines the state of the substrate processing tool 2 at any given time based on the data received from the process modules 4 and the various sensors employed by the substrate processing tool 2. The controller 10 controls the substrate processing tool 2 based on the state of the substrate processing tool 2.

The controller 10 controls (e.g., send the signals to) the substrate processing tool 2 based on operator inputs received via the display subsystem 204 and/or the input devices 202 (or remotely via the network interface 208). The controller 10 automates user interactions for the substrate processing tool 2 under the control of the applications 216 and the databases 218, which implement an artificial intelligence (AI) engine as described below in detail. The controller 10 can control the substrate processing tool 2 using the AI engine with or without user interactions.

The controller 10 can generate alarms based on the state of the substrate processing tool 2. For example, the controller 10 can generate alarms based on events, errors (errors that have occurred as well as impending errors), and so on in the substrate processing tool 2. The alarms can be output via the display subsystem 204 to alert the user (i.e., the operator) of the substrate processing tool 2. The alarms can also be output via an audio subsystem (not shown) of the substrate processing tool 2. The alarms can also be communicated as a message via the network interface 208.

The applications 216 learn from specific user actions that are performed in response to specific states of the substrate processing tool 2. For example, the applications 216 learn from user actions performed in response to alarms (e.g., actions performed to recover from errors). After monitoring the user's same reactions to events occurring in the substrate processing tool 2 (e.g., after the user reacts with the same set of inputs to a particular event say 3-5 times), the applications 216 store the state of the substrate processing tool 2 and corresponding actions performed by the operator in response to the state in the databases 218.

In some implementations, the databases 218 may already store relationships associated with the states of the substrate processing tool 2 and corresponding actions performed by the operator in response to the states. In such implementations, the applications 216 may continue to update the databases 218 based on learning from continued operation of the substrate processing tool 2.

In other implementations, the databases 218 may already store relationships associated with the states of various substrate processing tools and corresponding actions performed by operators in response to the states. For example, the relationships may be derived by replaying historical data (e.g., including event logs, alarm logs, and so on) from various substrate processing tools. The replaying may be performed in a simulated environment (e.g., by simulating a substrate processing system similar to that shown in FIGS. 1-3). The simulation process provides an additional advantage that in addition to replaying production data (tool states and responses) received from other substrate processing systems, various other operating conditions and responses can be simulated to further improve the learning process. For example, false alarms (e.g., an unnecessary maintenance task that is falsely triggered by an error) can be minimized or avoided by improving error detection under simulated conditions.

In such implementations, where the databases 218 are generated based on data received from various substrate processing systems, the applications 216 may configure (e.g., adapt or customize) the databases 218 according to the actual configuration of the substrate processing tool 2. The applications 216 may continue to update the databases 218 based on learning from continued operation of the substrate processing tool 2.

Based on the learning, the controller 10 can prompt the user to perform an action in response to a state of the substrate processing tool 2. For example, the controller 10 can correlate the state of the substrate processing tool 2 with a response to the state stored in the databases 218. Based on the correlation, the controller 10 can suggest a corrective or recovery action found in the databases 218 upon detecting an error in the substrate processing tool 2. As another example, the controller 10 can determine using data from one or more sensors in the substrate processing tool 2 that a preventive or corrective maintenance operation needs to be performed. The controller 10 can correlate the tool state with the data stored in the databases 218 and suggest a suitable action to perform based on the correlation.

The controller 10 can offer (e.g., suggest on a GUI on the display subsystem 204) to perform the proposed action automatically without user interaction. The controller 10 can determine if the operator is present to interact with the substrate processing tool 2. The controller 10 can detect the presence or absence of the operator based on the time of the day (e.g., based on the timings or working hours of scheduled shifts), based on whether the user is presently logged into the controller 10, and so on. If the user is not present (i.e., if the substrate processing tool 2 is unattended), the controller 10 can perform the task automatically and inform the user via a message about the state of the substrate processing tool 2 and the action being performed in response to the state.

Depending on the type of the task and/or configuration of the applications 216, the user can also remotely (i.e., when the user is not present in the vicinity of the substrate processing tool 2) authorize the controller 10 to perform the action without any further input from the user. Alternately, the user can remotely (or locally, i.e., when the user is present in the vicinity of the substrate processing tool 2) authorize the controller 10 to perform the action, monitor the controller's execution of the task, and intervene if necessary.

As mentioned above, the applications 216 learn from the actions of the user (i.e., the operator) of the substrate processing tool 2 how to recover from errors, how to perform complicated maintenance tasks (triggered as error-correcting measures as well as scheduled preventive measures), and so on. Based on the learning, the controller 10 can detect errors, recover from errors, and prevent a wafer from being damaged or scrapped.

It should be noted that some situations are peculiar or unique to semiconductor processing equipment such as the substrate processing tool 2 and make building an artificial intelligence (AI) engine challenging. For example, the process modules 4 of the substrate processing tool 2 can use various chemistries for various processes: various gases and liquids (collectively fluids); various pressures, temperatures, and power; various sequences of the fluids, pressures, temperatures, and power; and so on. It can be challenging to learn and automate user interactions for substrate processing tools involving such diverse and wide ranging electrical, mechanical, and chemical controls.

At times, a fast response (e.g., in a few seconds or in a fraction of a second) can be critical to prevent a wafer from being damaged or scrapped in semiconductor processing equipment such as the substrate processing tool 2. The artificial intelligence (AI) engine according to the present disclosure can respond to such situations much faster than a human operator can.

Another peculiar or unique parameter specific to semiconductor processing equipment such as the substrate processing tool 2 is queue time: a wafer being processed using a sequence of processes needs to be transferred from one process module to another within a predetermined time called a queue time. The queue time can vary depending on the type of process already performed on the wafer in one process module and the type of process that will be subsequently performed on the wafer in another process module. If the wafer is not processed within the queue time, the wafer may have to be scrapped. The AI engine uses learned queue time data to intervene within the queue time (i.e., before the queue time expires) if no user is present and prevents the wafer from being scrapped.

The AI engine detects errors in the substrate processing tool 2. If the AI engine recognizes a prior recovery procedure for a tool state based on the learning (i.e., based on correlation of the tool state with data stored in the databases 218), the AI engine does one of the following: If a user is operating the tool (e.g., if the user is present), the AI engine can offer to help the user. The user can let the AI engine execute the recovery sequence automatically. The user can intervene if the AI engine's automatic execution of the recovery sequence is necessary. Alternately, if no user is present and if the AI engine detects a possibility of a wafer scrap, the AI engine can automatically intervene and prevent the wafer from being scrapped.

Other examples of situations or scenarios from which the AI engine can learn and in which the AI engine can subsequently act include the following. For example, the substrate processing tool 2 can suffer from robot gripper errors. For example, the tool may stop twice a day during production due to robot gripper errors. The replacement parts may be on order but can take many weeks to be delivered, which can lead to tool downtime and 24/7 technician support.

The recovery of robot gripper errors is complicated and requires skilled intervention. Errors in the recovery may lead to robot crashes and result in the wafer being scrapped. The wafers are also subject to queue time constrains. Accordingly, the wafers need to be recovered within a given time or the wafers have to be scrapped. This situation can cause tool downtime and require 24/7 technician support.

Instead, the AI engine can respond as follows. The AI engine has access to the tool information in real time. The AI engine will learn user interventions to the errors and the tool states. After having recorded user responses to the above situation a plurality of times (e.g., 3-5 times), the AI engine is capable of executing a sequence stored in the databases 218 and recovering from the errors. For example, during production, the AI engine can be set on automatic recovery mode. When this mode is active and the above error occurs, the AI engine will intervene if the queue time might put the wafers at risk. This way, the tool can be used for production until the replacement parts are installed. The AI engine can anticipate the error based on data received from the sensors associated with the robot 8 and can proactively order parts before the error occurs. Such proactive actions can avoid or minimize the tool downtime, the need for 24/7 technician support, and the possibility of the wafers being scrapped.

Figure 5:
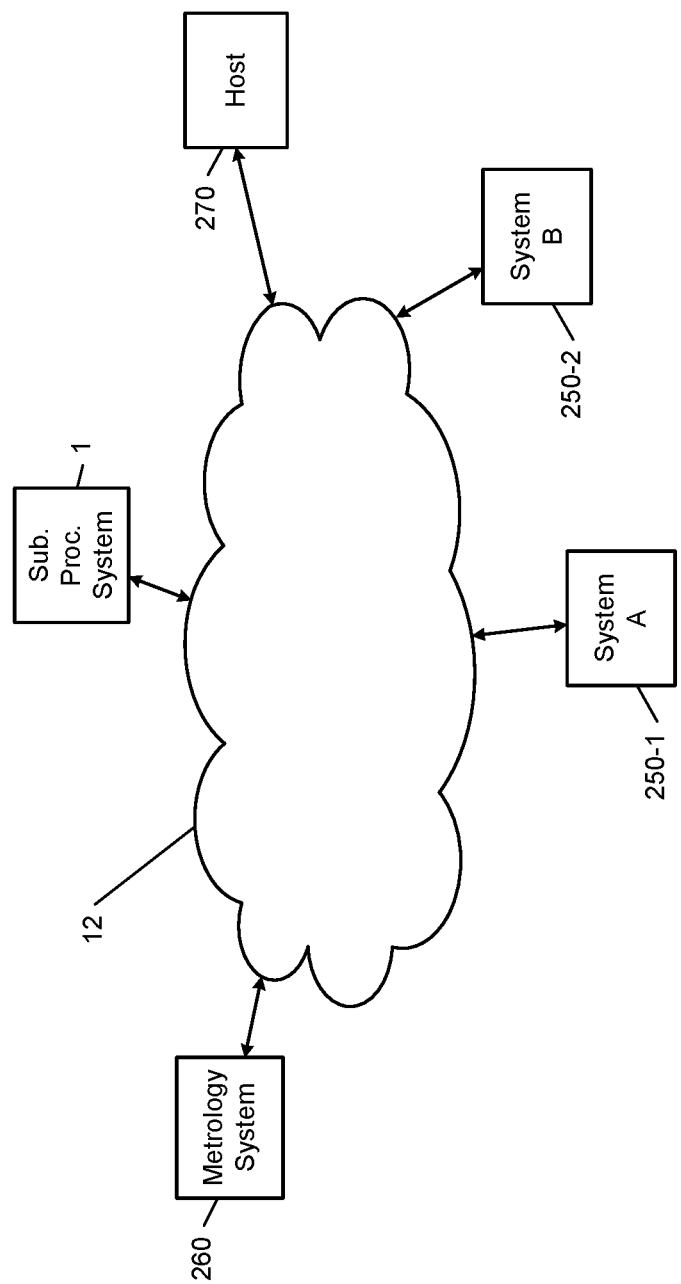
FIG. 5 is a functional block diagram of a distributed network system comprising the substrate processing system of FIG. 1, a plurality of systems upstream and downstream from the substrate processing system, a metrology system, and a host according to the present disclosure.

FIG. 5 shows a network comprising the substrate processing system 1, systems A 250-1 and B 250-2 (collectively other systems 250), a metrology system 260, and a host 270 communicating with each other via the distributed network system 12. For example, the systems A 250-1 and B 250-2 may be respectively located upstream and downstream relative to the substrate processing system 1. For example, the system A 250-1 located upstream from the substrate processing system 1 may prepare a substrate for processing by the substrate processing system 1. The system A 250-1 may provide data about the substrate. Depending on data received from the system A 250-1, the substrate processing system 1 can optimize settings and/or process parameters of one or more process modules 4 and the robot 8 of the substrate processing tool 2 for processing the substrate. Accordingly, the substrate processing system 1 can use the data from the system A 250-1 to refine the state of the substrate processing tool 2. The substrate processing system 1 can learn and expect similar data in the future. Additionally, the substrate processing system 1 may receive data from the system B 250-2 located downstream and can learn from the data (i.e., optimize settings and/or process parameters of one or more process modules 4 and the robot 8 based on the data).

The metrology system 260 can use one or more of optical metrology and mass metrology to perform numerous measurements of the substrate before, during, and/or after the processing of the substrate by the substrate processing system 1. For example, the mass metrology system may be used to measure mass before and after a process to determine mass change. The optical metrology can be used to create a spectral model of a surface to determine thickness. The mass change and the thickness can be used as feedback. The measurements can indicate the status of the substrate and success of one or more processes (e.g., deposition, etching, cleaning, and so on) performed on the substrate. For example, depending on the measurements, the status of the substrate may indicate one or more of the following: whether the substrate is ready for processing by the substrate processing system 1, whether the substrate is being correctly processed by the one or more process modules 4 (e.g., whether the substrate is properly etched; cleaned; and/or whether deposition is correctly performed, etc.), whether the processing of the substrate by the substrate processing system 1 was completed successfully, and so on. The metrology data can be used to optimize settings and/or process parameters of one or more process modules 4 and the robot 8 of the substrate processing tool 2. Accordingly, the metrology data can be used to further refine the state of the substrate processing tool 2. While only one metrology system is shown for simplicity of illustration, more than one metrology system can be used. For example, one metrology system may be used before the substrate is processed by the substrate processing system 1, and another metrology system may be used after the substrate is processed by the substrate processing system 1.

The host 270 may include one or more servers. Each server may include all of the components of the controller 10 shown in FIG. 4. The host 270 may perform some or all of the functions of the controller 10. The host 270 may control the substrate processing tool 2 with or without the controller 10. The host 270 can communicate with the substrate processing tool 2 via the controller 10 and/or directly (i.e., without communicating through the controller 10). The host 270 can communicate directly with any component of the substrate processing tool 2 (e.g., with the robot 8 and any of the process modules 4). The controllers 80 and 176 (see FIGS. 2 and 3), which are examples of the process modules 4, may be similar to the controller 10 shown in FIG. 4. Each process module 4 may communicate with the host 270 directly via the network interface 208. Each process module 4 may communicate with other process modules 4, the robot 8, and/or the controller 10 via the interface 220. The robot 8 may also include a controller similar to the controller 10. The robot 8 may communicate with the host 270 directly via the network interface 208. The robot 8 may communicate with the process modules 4 and/or the controller 10 via the interface 220. Accordingly, the process modules 4 and the robot 8 can directly communicate with the host 270 and can be directly controlled by the host 270. The host 270 can be located on-premises or in the cloud. The host 270 can store additional data relevant for controlling the substrate processing tool 2 with or without user interaction. The additional data can include but is not limited to data from the other systems 250, the metrology system 260, and other substrate processing systems (see FIG. 6 and corresponding description below).

Figure 6:
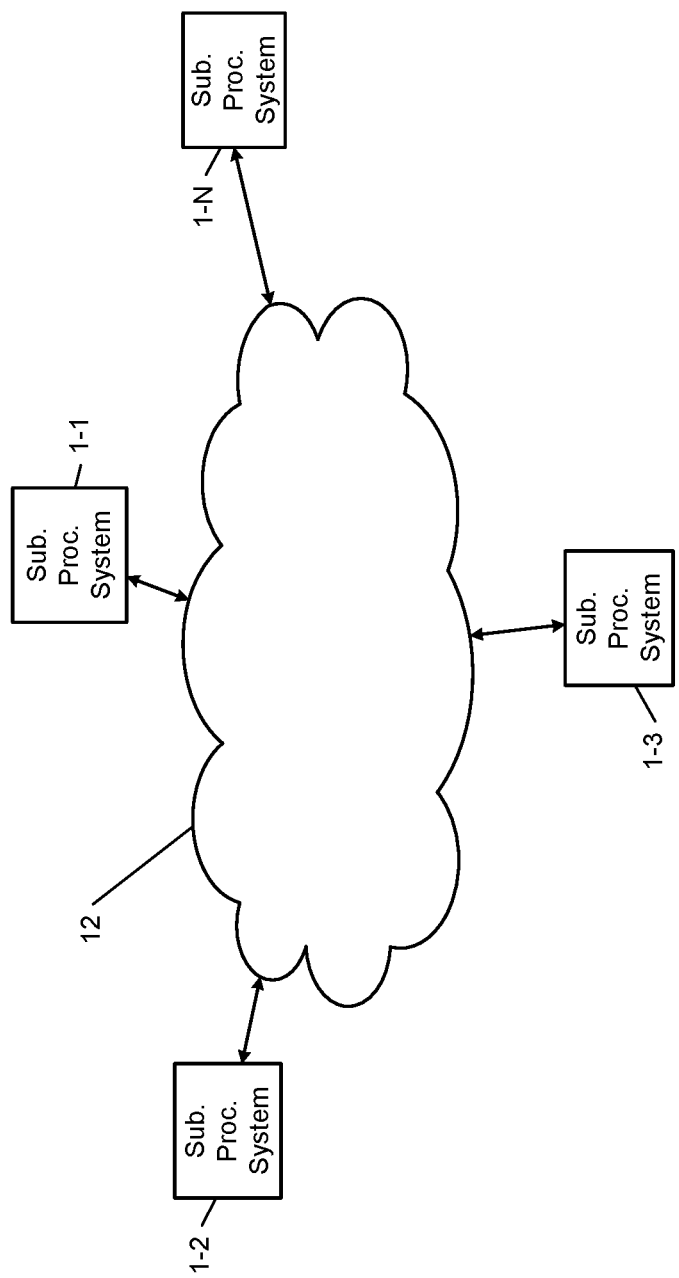
FIG. 6 is a functional block diagram of the distributed network system of FIG. 5 further comprising a plurality of the substrate processing system of FIG. 1 according to the present disclosure.

FIG. 6 shows a plurality of substrate processing systems 1-1, 1-2, 1-3, . . . , and 1-N, where N is an integer greater than 1 (collectively substrate processing systems 1) that can communicate with each other via the distributed network system 12. The substrate processing systems 1 may be located at a single location or may be distributed across multiple locations. The substrate processing systems 1 may share data regarding their states and responses thereto with each other. Any of the substrate processing systems 1 can generate, update, and/or customize the applications 216 and databases 218 of one or more substrate processing systems within or outside the substrate processing systems 1 based on the shared data (e.g., by replaying the shared data using the simulation process described above).

In use, the AI engine (i.e., the applications 216 and the databases 218) has access to all states of the tool in real time. The AI engine can correlate tool states and user actions stored in the databases 218. The AI engine can learn how users react to tool states (e.g., the AI engine learns how users recover from specific alarms). After say 3-5 occurrences where the user reacted similarly to a tool state, the AI engine is capable of executing the sequence for the user.

If a sequence is recognized (i.e., if the current tool state correlates to a state with a learned response in the database), the AI engine will detect if the tool is currently operated by a user (i.e., if a user is present). If a user is present, the AI engine will offer to help the user (e.g., by displaying a message or a suggested response (found based on the correlation) on the GUI). Alternately, if a sequence is recognized, and if no user is present, the AI engine can take over control if setup (i.e., configured) to do so.

The AI engine can also learn about queue time. The AI engine can use this data to intervene if no user is present and if the wafers might get scrapped. Learned scenarios from customers (i.e., other tools) and lab tools (e.g., replays, simulations, and so on) can be stored, collected, and compiled into a master database, which can then be used to install, customize, or update individual databases on other tools. The base capabilities of the AI engine can continue to grow over time with learning from the tool on which the AI engine is installed as well as with learning from other tools as mentioned above. Customers who do not wish to share the data about their learned AI engines still have the functionality to aggregate the AI learning over their tool fleet (i.e., their set of tools).

Methods for automating user interaction for semiconductor manufacturing equipment are described below with reference to FIGS. 7-9. In the description below, the term control refers to one or more of the applications 216 described above with reference to FIGS. 1-6, which implement the methods described below. In other words, the term control represents code or instructions executed by one or more components of the substrate processing systems 1 shown in FIGS. 1-6 to perform the described functionality. For example, the method described below may be performed by the controller 10 shown in FIGS. 1 and 4 and/or the host 270 shown in FIG. 5.

Figure 7:
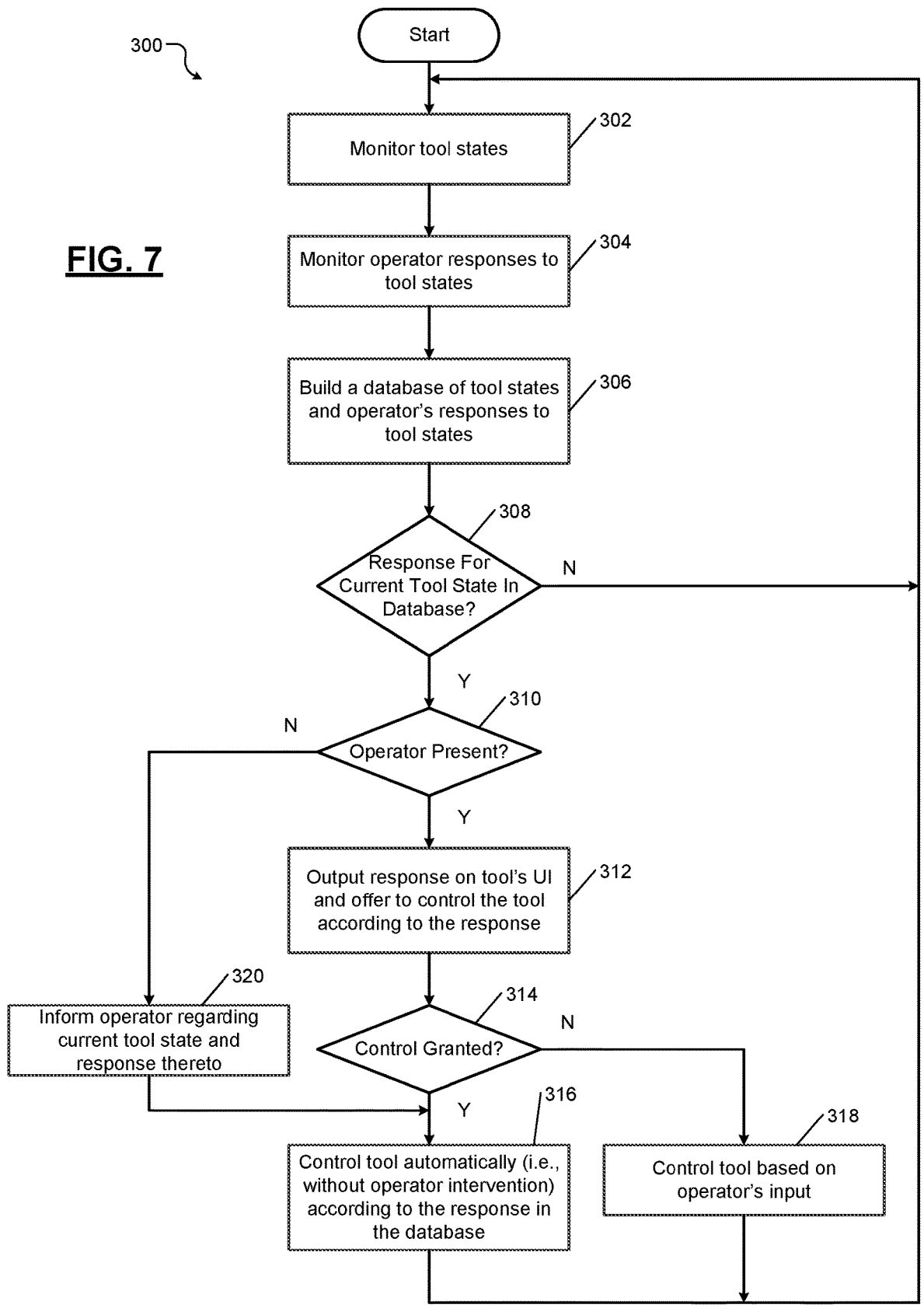
FIG. 7 is a flowchart of a method for automating user interaction for the substrate processing system of FIG. 1 using artificial intelligence according to the present disclosure.

FIG. 7 shows a method 300 for automating user interaction for semiconductor manufacturing equipment (e.g., the substrate processing system 1 of FIG. 1) using artificial intelligence. At 302, control (e.g., one or more of the applications 216) monitors the states of a substrate processing tool (e.g., the substrate processing tool 2 of FIG. 1). At 304, control monitors operator responses to the tool states. At 306, control compiles (i.e., generates or builds) a database (e.g., one or more of the databases 218) of tool states and the operator's responses to the tool states. For example, control stores in the database a tool state and the operator's response to the tool state after the operator has reacted to the tool state using the same response a predetermined number of times (e.g., 3-5 times).

At 308, control determines a current tool state of the substrate processing tool based on the data received from the substrate processing tool in real time and determines whether a response for the current tool state is in the database. For example, control makes this determination by correlating the current tool state with the tool states with known responses stored in the database. Control returns to 302 if the correlation cannot find a tool state matching the current tool state in the database.

At 310, if a match for the current tool state is found in the database, control determines whether operator is present to respond to the current tool state. For example, control detects the presence or absence of the operator based on the time of the day and operators' shift schedule, whether the operator has logged into the system (e.g., the controller 10), and so on.

At 312, if the operator is present, control outputs the response corresponding to the matching tool state found in the database on the display (e.g., on the GUI on the display) of the substrate processing tool. Control offers to control the substrate processing tool according to the response.

At 314, control determines whether the operator allows it to automatically control the substrate processing tool according to the response without any operator input. At 316, if the operator allows automatic control of the substrate processing tool according to the response without any operator input, control automatically controls the substrate processing tool without operator intervention, and control returns to 302.

At 318, if the operator does not allow automatic control of the substrate processing tool according to the response without any operator input, control receives input or inputs from the operator and controls the substrate processing tool according to the operator's input or inputs, and control returns to 302.

At 320, if control determines at 310 that the operator is not present, control informs the operator regarding the current tool state and the response to the current tool state, and control proceeds to 316. For example, control sends a message to the operator regarding the current tool state and the response to the current tool state. While not shown, control can proceed to 314 instead of proceeding to 316. If control proceeds to 314, the operator can remotely allow the control to automatically control the substrate processing tool according to the response without any operator input, in which case control proceeds to 316. Alternately, if control proceeds to 314, and if the operator does not allow the control to automatically control the substrate processing tool according to the response without any operator input, control proceeds to 318.

Figure 8:
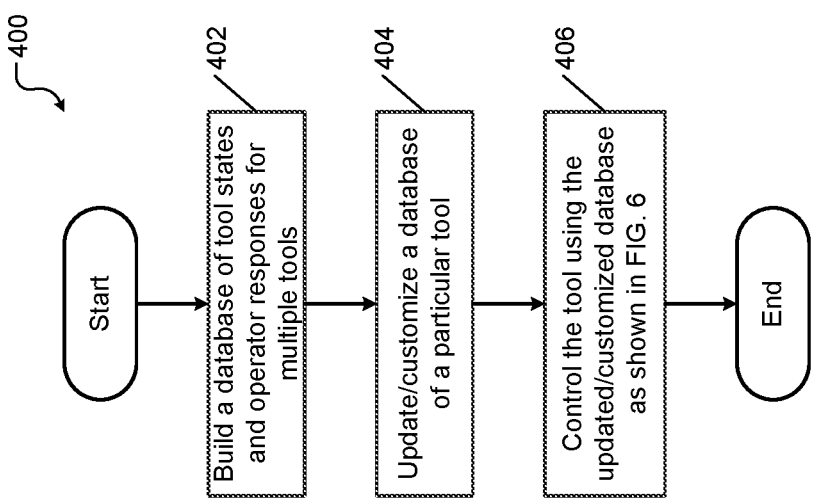
FIG. 8 is a flowchart of a method for building a database of tool states and responses for a substrate processing tool based on data received from multiple substrate processing tools according to the present disclosure.

FIG. 8 shows a method 400 for building a database of tool states and responses for a particular substrate processing tool based on data received from multiple substrate processing tools. At 402, control builds a master database of tool states and corresponding operator responses for the tool states based on data received from multiple substrate processing tools. At 404, control customizes a database of a particular substrate processing tool by configuring the master database (generated at 402 from data received from multiple substrate processing tools) according to the configuration of the particular substrate processing tool. Alternately, if the particular substrate processing tool already has a database, control updates the database by adding relevant information from the master database (generated at 402 from data received from multiple substrate processing tools). Control selects the relevant information based on the configuration of the particular substrate processing tool. At 406, control performs the control operations of the particular substrate processing tool using the customized/updated database according to the method 300 shown in FIG. 7.

Figure 9:
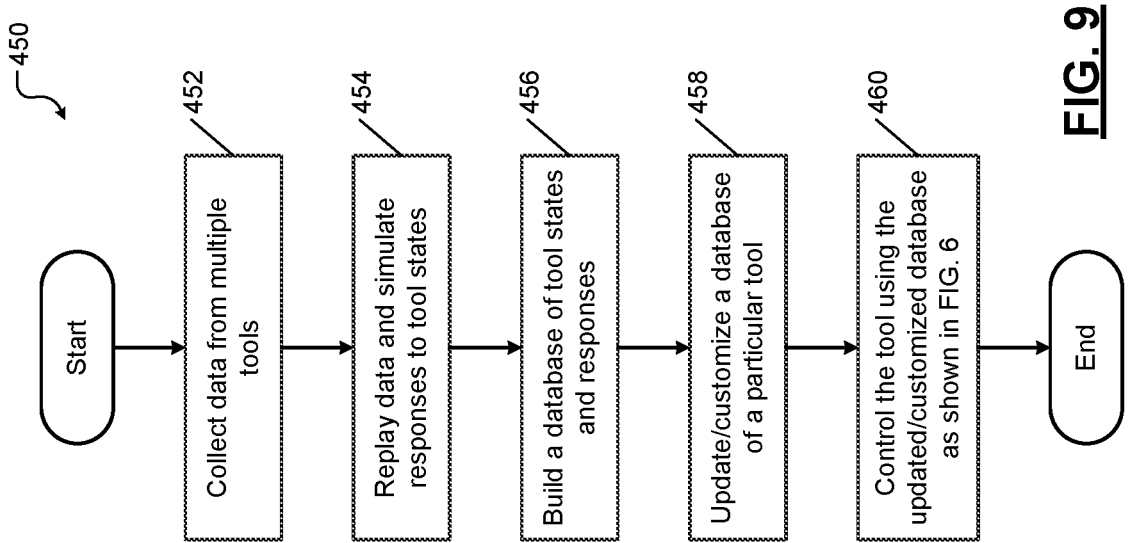
FIG. 9 is a flowchart of a method for building a database of tool states and responses for a substrate processing tool by replaying data received from multiple substrate processing tools and using simulation according to the present disclosure.

FIG. 9 shows a method 450 for building a database of tool states and responses for a particular substrate processing tool by replaying data received from multiple substrate processing tools in a simulated environment. At 452, control collects data from multiple substrate processing tools (e.g., see FIG. 6). At 454, control replays the data in a simulated substrate processing tool, where responses to tool states can be simulated. At 456, control builds a master database of tool states and corresponding responses for the tool states based on replaying the data received from multiple substrate processing tools in the simulated environment.

At 458, control customizes a database of a particular substrate processing tool by configuring the master database (generated at 456 from data received from multiple substrate processing tools) according to the configuration of the particular substrate processing tool. Alternately, if the particular substrate processing tool already has a database, control updates the database by adding relevant information from the master database (generated at 456 from data received from multiple substrate processing tools). Control selects the relevant information based on the configuration of the particular substrate processing tool. At 460, control performs the control operations of the particular substrate processing tool using the customized/updated database according to the method 300 shown in FIG. 7.

Throughout the present disclosure, references to terms such as computers (e.g., servers), applications (e.g., computer programs), and so on are for illustrative purposes only. The terms such as computers (e.g., servers) are to be understood broadly as representing computing devices comprising one or more processors and memory configured to execute machine readable instructions. The terms such as applications (e.g., computer programs) are to be understood broadly as representing machine readable instructions executable by the computing devices.

Throughout the present disclosure, the process modules are used for example only. The teachings of the present disclosure are applicable to any type of processing equipment (e.g., batch reactors, ion implanters, and so on). For example, the teachings of the present disclosure can be applied to any equipment processing samples such as biological samples, chemical samples, medical samples, and so on. Further, throughout the present disclosure, the substrate is used for example only. The teachings of the present disclosure can be applied to process any object or workpiece. For example, the teachings of the present disclosure can be applied to process objects or workpieces using optical, thermal, chemical, magnetic, and mechanical processes. In other words, the teachings of the present disclosure can be applied to learn from the operation of any equipment that processes an object using multiple processes and to control the equipment and the processing of the object based on the learning to minimize human interaction and to reduce the risk of damage to the object.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In some implementations, a controller is part of a system, which may be part of the above-described examples. Such systems can comprise semiconductor processing equipment, including a processing tool or tools, chamber or chambers, a platform or platforms for processing, and/or specific processing components (a wafer pedestal, a gas flow system, etc.). These systems may be integrated with electronics for controlling their operation before, during, and after processing of a semiconductor wafer or substrate. The electronics may be referred to as the "controller," which may control various components or subparts of the system or systems. The controller, depending on the processing requirements and/or the type of system, may be programmed to control any of the processes disclosed herein, including the delivery of processing gases, temperature settings (e.g., heating and/or cooling), pressure settings, vacuum settings, power settings, radio frequency (RF) generator settings, RF matching circuit settings, frequency settings, flow rate settings, fluid delivery settings, positional and operation settings, wafer transfers into and out of a tool and other transfer tools and/or load locks connected to or interfaced with a specific system.

Broadly speaking, the controller may be defined as electronics having various integrated circuits, logic, memory, and/or software that receive instructions, issue instructions, control operation, enable cleaning operations, enable end-point measurements, and the like. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software). Program instructions may be instructions communicated to the controller in the form of various individual settings (or program files), defining operational parameters for carrying out a particular process on or for a semiconductor wafer or to a system. The operational parameters may, in some embodiments, be part of a recipe defined by process engineers to accomplish one or more processing steps during the fabrication of one or more layers, materials, metals, oxides, silicon, silicon dioxide, surfaces, circuits, and/or dies of a wafer.

The controller, in some implementations, may be a part of or coupled to a computer that is integrated with the system, coupled to the system, otherwise networked to the system, or a combination thereof. For example, the controller may be in the "cloud" or all or a part of a fab host computer system, which can allow for remote access of the wafer processing. The computer may enable remote access to the system to monitor current progress of fabrication operations, examine a history of past fabrication operations, examine trends or performance metrics from a plurality of fabrication operations, to change parameters of current processing, to set processing steps to follow a current processing, or to start a new process. In some examples, a remote computer (e.g. a server) can provide process recipes to a system over a network, which may include a local network or the Internet. The remote computer may include a user interface that enables entry or programming of parameters and/or settings, which are then communicated to the system from the remote computer. In some examples, the controller receives instructions in the form of data, which specify parameters for each of the processing steps to be performed during one or more operations. It should be understood that the parameters may be specific to the type of process to be performed and the type of tool that the controller is configured to interface with or control. Thus as described above, the controller may be distributed, such as by comprising one or more discrete controllers that are networked together and working towards a common purpose, such as the processes and controls described herein. An example of a distributed controller for such purposes would be one or more integrated circuits on a chamber in communication with one or more integrated circuits located remotely (such as at the platform level or as part of a remote computer) that combine to control a process on the chamber.

Without limitation, example systems may include a plasma etch chamber or module, a deposition chamber or module, a spin-rinse chamber or module, a metal plating chamber or module, a clean chamber or module, a bevel edge etch chamber or module, a physical vapor deposition (PVD) chamber or module, a chemical vapor deposition (CVD) chamber or module, an atomic layer deposition (ALD) chamber or module, an atomic layer etch (ALE) chamber or module, an ion implantation chamber or module, a track chamber or module, and any other semiconductor processing systems that may be associated or used in the fabrication and/or manufacturing of semiconductor wafers.

As noted above, depending on the process step or steps to be performed by the tool, the controller might communicate with one or more of other tool circuits or modules, other tool components, cluster tools, other tool interfaces, adjacent tools, neighboring tools, tools located throughout a factory, a main computer, another controller, or tools used in material transport that bring containers of wafers to and from tool locations and/or load ports in a semiconductor manufacturing factory.

What is claimed is:

1. A system comprising:
    an interface to receive a state of a substrate processing tool comprising a plurality of process modules configured to process a substrate, wherein the state of the substrate processing tool is determined based on data received from the process modules of the substrate processing tool and from a plurality of sensors associated with the substrate processing tool; and
    a controller coupled to the interface to:
        generate a correlation between the state of the substrate processing tool received by the interface and an input previously received by the substrate processing tool from the interface to control the substrate processing tool in response to a prior occurrence of the state; and
        generate an output including a response similar to the input previously received to control the substrate processing tool, based on the correlation between the state of the substrate processing tool received by the interface and the input previously received by the substrate processing tool from the interface in response to the prior occurrence of the state.

2. The system of claim 1 wherein the controller is configured to store in a database a plurality of states of the substrate processing tool and corresponding inputs received by the substrate processing tool based on the plurality of states, and to perform the correlation using the database.

3. The system of claim 2 wherein the controller is configured to update the database based on historical data associated with one or more of the substrate processing tool and an additional substrate processing tool, and to perform the correlation using the updated database.

4. The system of claim 2 wherein the controller is configured to store in the database data associated with an additional substrate processing tool, the data including states of the additional substrate processing tool and corresponding inputs received by the additional substrate processing tool based on the states, and to perform the correlation using the data.

5. The system of claim 1 wherein the state of the substrate processing tool includes data indicating an error associated with the substrate processing tool and wherein the input includes data indicating a response to the error.

6. The system of claim 1 wherein the state of the substrate processing tool includes data indicating an impending error associated with the substrate processing tool and wherein the input includes data indicating a response to prevent the error.

7. The system of claim 1 wherein the controller is configured to detect presence of an operator of the substrate processing tool and to control the substrate processing tool according to a response received by the operator based on the output.

8. The system of claim 1 wherein the controller is configured to detect absence of an operator of the substrate processing tool and to control the substrate processing tool in the absence of the operator based on the output.

9. The system of claim 1 wherein the controller is configured to detect absence of an operator of the substrate processing tool and to inform the operator regarding the output.

10. The system of claim 1 wherein the controller is configured to control the substrate processing tool based on the output to ensure completion of processing of the substrate, prevent damage to the substrate, and prevent idling of the process modules.

11. The system of claim 1 wherein the controller is configured to control the substrate processing tool based on the output to optimize scheduling of processing of the substrate by the process modules.

12. A method comprising:
    receiving data from a plurality of process modules of a substrate processing tool and from a plurality of sensors associated with the substrate processing tool;
    determining a state of the substrate processing tool based on the data received from the process modules and the sensors,
    generating a correlation between the state of the substrate processing tool and an input previously received by the substrate processing tool to control the substrate processing tool in response to a prior occurrence of the state; and
    generating an output including a response similar to the input previously received to control the substrate processing tool, based on the correlation between the state of the substrate processing tool and the input previously received by the substrate processing tool in response to the prior occurrence of the state.

13. The method of claim 12 further comprising:
    storing in a database a plurality of states of the substrate processing tool and corresponding inputs received by the substrate processing tool based on the plurality of states; and
    performing the correlation using the database.

14. The method of claim 13 further comprising:
updating the database based on historical data associated with one or more of the substrate processing tool and an additional substrate processing tool; and
performing the correlation using the updated database.

15. The method of claim 13 further comprising:
storing in the database data associated with an additional substrate processing tool, the data including states of the additional substrate processing tool and corresponding inputs received by the additional substrate processing tool based on the states; and
performing the correlation using the data.

16. The method of claim 12 wherein the state of the substrate processing tool includes data indicating an error associated with the substrate processing tool and wherein the input includes data indicating a response to the error.

17. The method of claim 12 wherein the state of the substrate processing tool includes data indicating an impending error associated with the substrate processing tool and wherein the input includes data indicating a response to prevent the error.

18. The method of claim 12 further comprising:
detecting presence of an operator of the substrate processing tool; and
controlling the substrate processing tool according to a response received by the operator based on the output.

19. The method of claim 12 further comprising:
detecting absence of an operator of the substrate processing tool; and
controlling the substrate processing tool in the absence of the operator based on the output.

20. The method of claim 12 further comprising:
detecting absence of an operator of the substrate processing tool; and
informing the operator regarding the output.

21. The method of claim 12 further comprising controlling the substrate processing tool based on the output to ensure completion of processing of the substrate, prevent damage to the substrate, and prevent idling of the process modules.

22. The method of claim 12 further comprising controlling the substrate processing tool based on the output to optimize scheduling of processing of the substrate by the process modules.

23. A system comprising:
a processor; and
machine readable instructions, stored on a tangible machine readable medium, when executed by the processor, configure the processor to:
receive data from a plurality of process modules of a substrate processing tool and from a plurality of sensors associated with the substrate processing tool;
determine a state of the substrate processing tool based on the data received from the process modules and the sensors;
generate a correlation between the state of the substrate processing tool and with an input previously received by the substrate processing tool to control the substrate processing tool in response to a prior occurrence of; and
generate an output including a response similar to the input previously received to control the substrate processing tool, based on the correlation between the state of the substrate processing tool and the input previously received by the substrate processing tool in response to the prior occurrence of the state.

24. The system of claim 23 wherein the machine readable instructions configure the processor to:
store in a database a plurality of states of the substrate processing tool and corresponding inputs received by the substrate processing tool based on the plurality of states; and
perform the correlation using the database.

25. The system of claim 24 wherein the machine readable instructions configure the processor to:
update the database based on historical data associated with one or more of the substrate processing tool and an additional substrate processing tool; and
perform the correlation using the updated database.

26. The system of claim 24 wherein the machine readable instructions configure the processor to:
store in the database data associated with an additional substrate processing tool, the data including states of the additional substrate processing tool and corresponding inputs received by the additional substrate processing tool based on the states; and
perform the correlation using the data.

27. The system of claim 23 wherein the state of the substrate processing tool includes data indicating an error associated with the substrate processing tool and wherein the input includes data indicating a response to the error.

28. The system of claim 23 wherein the state of the substrate processing tool includes data indicating an impending error associated with the substrate processing tool and wherein the input includes data indicating a response to prevent the error.

29. The system of claim 23 wherein the machine readable instructions configure the processor to:
detect presence of an operator of the substrate processing tool; and
control the substrate processing tool according to a response received by the operator based on the output.

30. The system of claim 23 wherein the machine readable instructions configure the processor to:
detect absence of an operator of the substrate processing tool; and
control the substrate processing tool in the absence of the operator based on the output.

31. The system of claim 23 wherein the machine readable instructions configure the processor to:
detect absence of an operator of the substrate processing tool; and
inform the operator regarding the output.

32. The system of claim 23 wherein the machine readable instructions configure the processor to control the substrate processing tool based on the output to ensure completion of processing of the substrate, prevent damage to the substrate, and prevent idling of the process modules.

33. The system of claim 23 wherein the machine readable instructions configure the processor to control the substrate processing tool based on the output to optimize scheduling of processing of the substrate by the process modules.

* * * * *